3,565,674
Patented Feb. 23, 1971

3,565,674

DEPOSITION OF SILICON NITRIDE

Bernard W. Boland and Don M. Jackson, Jr., Scottsdale, and James H. Williams, Tempe, Ariz., assignors to Motorola, Inc., Franklin Park, Ill., a corporation of Illinois No Drawing. Continuation of application Ser. No. 679,217, Oct. 30, 1967. This application Mar. 10, 1970, Ser. No. 17,046
Int. Cl. C23c *11/00*
U.S. Cl. 117—106 6 Claims

ABSTRACT OF THE DISCLOSURE

Silicon nitride is deposited by the reaction of silane with ammonia, in a hydrogen ambient, upon contact with a heated substrate. The ratio of ammonia to silane is particularly critical in determining the nature of the nitride deposit.

This application is a continuation of my co-pending application, Ser. No. 679,217, filed Oct. 30, 1967, "Deposition of Silicon Nitride" (now abandoned).

BACKGROUND

This invention relates to the pyrolytic deposition of silicon nitride formed by the reaction of silicon hydride with ammonia upon contact with a hot substrate. More particularly, the invention is directed to the deposition of pyrolytic silicon nitride in the fabrication of semconductor devices.

Silicon nitride ($Si_3N_4$) is a dense, chemically inert, dielectric material of extreme hardness, low thermal conductivity and a high resistance to molecular diffusion. These properties are useful in a wide range of applications. Hard, abrasive-resistant structural members may be provided by depositing a coat of silicon nitride on a suitable base member. It is particularly useful as an electrical insulator at high temperatures, or as a high temperature furnace window.

Pyrolytic silicon nitride has been found particularly useful in the fabrication of microelectronic semiconductor devices. It has been proposed as a substitute for silicon oxide for the passivation of PN junctions, and as a superior mask for selective diffusion operations. Also, in the manufacture of field-effect transistors, silicon nitride has been found superior to silicon oxide in many respects because of its greater dielectric strength and its resistance to the formation of electrostatic surface inversion layers. Silicon nitride is particularly desirable for its resistance to change upon being subjected to electron irradiation.

In the fabrication of germanium devices, the use of gallium as a conductivity-type determining impurity is greatly preferred for many purposes with respect to other P-type dopants. Selective diffusion of gallium using silicon oxide as a mask has been notoriously unsuccessful due to the permeability of the oxide to gallium dopants. Silicon nitride, however, is substantially impermeable to gallium and is therefore useful as a mask in the fabrication of germanium transistors, diodes, integrated circuits, etc.

The reaction of silane with anhydrous ($NH_3$) ammonia to produce silicon nitride has been previously reported, at a pressure of about 0.1 torr under R.F. discharge. It is also known to react silicon tetrafluoride with ammonia to form a pyrolytic deposit of silicon nitride, and to react elemental silicon with nitrogen, or with ammonia, to produce the nitride.

These processes have certain disadvantages, especially when used in the fabrication of microelectronic semiconductor devices. The use of silicon tetrafluoride as a source of silicon is undesirable because a significant amount of the fluoride usually remains fixed in the nitride deposit, which adversely affects both the structural quality of the deposit and the electrical characteristics of the semiconductor device. The formation of a silicon nitride film under conditions of high vacuum and R.F. discharge is not satisfactory because of the difficulty in controlling growth rates, the consequent poor quailty of the deposit, and the added expense of providing both the high vacuum and the R.F. discharge.

THE INVENTION

It is an object of the invention to provide an improved method for the pyrolytic deposition of silicon nitride. It is a further object of the invention to provide an improved diffusion mask for use in the fabrication of semiconductor devices. It is also an object of the invention to provide improved passivation for PN junctions of semiconductor devices.

A primary feature of the invention is the close control required for process conditions, and the critical ratios of reactants. The molar ratio of ammonia to silane is maintained between about 60 to 1 and 200 to 1, while the temperature of the substrate is maintained between 800° and 1150° C.

A ratio of ammonia to silane in excess of 200 to 1 leads to a slow rate of growth and a poor quality deposit, characterized by inclusions and poor etch-resistance. A ratio of less than 60 to 1 produces a silicon-rich nitride, which lacks the desired hardness.

An additional feature of the invention is the control of growth rates by adjusting the molar ratio of hydrogen to silane. Generally, the ratio is maintained in excess of 1000 to 1, and may range as high as 10,000 to 1. An additional feature of the invention involves the selective diffusion of gallium dopants into a germanium substrate, using a silicon nitride film as an improved mask.

When using the above mentioned ratios of ammonia to silane and of hydrogen to silane, the maintenance of a temperature between 800° and 1150° is essential. Higher temperatures lead to a premature decomposition of silane in the atmosphere surrounding the substrate, which tends to reduce the efficiency of the operation and to produce random deposits upon the furnace walls and upon the outlet lines, while the use of lower temperatures reduce the growth rate below a practical minimum.

The invention is embodied in a method for the pyrolytic deposition of silicon nitride, which comprises the steps of passing a mixture of hydrogen, silane and ammonia in contact with a substrate maintained at a temperature between 800° and 1150° C., while maintaining the molar ratio of hydrogen to silane in excess of 1000 to 1 and the molar ratio of ammonia to silane between 60 to 1 and 200 to 1.

A suitable apparatus to be used in the practice of the invention is an induction-heated tubular quartz furnace, such as that conventionally employed for the epitaxial growth of semiconductor materials. The system generally consists of a quartz reaction chamber including therein a quartz boat inside of which is placed a graphite or molybdenum R.F. susceptor, surrounded by an induction coil energized by a radio frequency oscillator. The substrate material on which the silicon nitride or germanium nitride is to be deposited is placed upon the quartz boat which in turn is heated indirectly by radiation from the induction coil. The apparatus also includes a system of connecting lines and valves for the control of flow rates of gases charged to the reaction chamber. An example of such apparatus is disclosed in U.S. 3,243,323 to W. J. Corrigan et al.

The invention is further illustrated by the following example:

EXAMPLE

Four polished 8 to 12 ohm-centimeter P-type silicon wafers and four polished 10 to 15 ohm-centimeter N-type silicon wafers were placed in a quartz furnace as described above. The hydrogen flow rate of 38 liters per minute was established, and the wafers were brought to a temperature of 1200° C. Prior to the deposition of silicon nitride, the wafers were chemically polished by adding to the stream of hydrogen approxmately 2.0% HCl by volume. After about 10 minutes, the flow of HCl etchant was terminated and the furnace allowed to cool to a temperature of about 940° to 950° C. with continued hydrogen flow. About 7 cc.'s per minute of silane was then blended with the hydrogen stream. After ten seconds of silane flow, ammonia was also admitted to the hydrogen stream, at a rate of about 1 liter per minute. These flow rates correspond to a molar ratio of hydrogen to silane of about 5400 to 1 and a molar ratio of ammonia to silane of about 143 to 1. The growth of silicon nitride was continued under the above conditions for about ten minutes, which provided a layer of silicon nitride of about 1.0 micron. Film quality was checked optically and showed no haze or inclusions under 400× dark-field examination.

The film was used as a mask against Ga and In diffusion. Diffusion times were in excess of 72 hrs. at 1200° C. Diode quality on N type wafers was comparable to the best planar devices. There was no indication that the Ga or In diffused through the $Si_3N_4$.

MOS devices were made using the $Si_3N_4$ film. The structures were heat treated at temperatures in excess of 350° C. for 24 hours. There were no apparent shifts in device characteristics that are normally encountered by sodium migration through the oxides. $Si_3N_4$ film were also found suitable as a mask for Al alloy-diffused devices.

We claim:

1. A method for the pyrolytic deposition of silicon nitride, $Si_3N_4$, upon a substrate material which comprises passing a mixture of hydrogen, silane and ammonia in contact with a substrate maintained at a temperature between 800° C. and 1150° C., while maintaining the molar ratio of hydrogen to silane in excess of 1000 to 1 and a molar ratio of ammonia to silane between 60 to 1 and 200 to 1.

2. A method as defined by claim 1 wherein the rate of silicon nitride growth is controlled by adjusting the molar ratio of hydrogen to silane.

3. A method as defined by claim 1 wherein the silicon nitride is deposited on a monocrystalline silicon substrate.

4. A method as defined by claim 3 wherein the substrate is etched with gaseous HCl prior to the growth of silicon nitride thereon.

5. A method as defined by claim 1 wherein the flow of silane is initiated prior to the flow of ammonia.

6. A method for the pyrolytic deposition of $Si_3N_4$ which is substantially free of uncombined silicon upon a substrate material which comprises passing a mixture of hydrogen, silane and ammonia in contact with a substrate maintained at temperature between 800° C. and 1150° C., while maintaining the molar ratio of hydrogen to silane in excess of 1000 to 1 and a molar ratio of ammonia to silane between 60 to 1 and 200 to 1.

References Cited

UNITED STATES PATENTS

Electronics, Jan. 10, 1966, p. 164 relied upon.

Doo et al.: Journal of the Electrochem. Society, vol. 113 No. 12, December 1966, pp. 1279–1281.

ALFRED L. LEAVITT, Primary Examiner

W. F. BALL, Assistant Examiner

U.S. Cl. X.R.

23—191